United States Patent
Adachi

(10) Patent No.: US 7,277,586 B2
(45) Date of Patent: Oct. 2, 2007

(54) IMAGES COMBINATION PROCESSING SYSTEM, IMAGES COMBINATION PROCESSING METHOD, AND IMAGES COMBINATION PROCESSING PROGRAM

(75) Inventor: Kaoru Adachi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 723 days.

(21) Appl. No.: 10/755,386

(22) Filed: Jan. 13, 2004

(65) Prior Publication Data

US 2004/0141068 A1 Jul. 22, 2004

(30) Foreign Application Priority Data

Jan. 15, 2003 (JP) .......................... P2003-007234
Jan. 21, 2003 (JP) .......................... P2003-012626

(51) Int. Cl.
G06K 9/36 (2006.01)
G06K 9/46 (2006.01)

(52) U.S. Cl. .............. 382/233; 382/232; 382/235; 382/245; 382/251; 375/240.2; 375/240.12

(58) Field of Classification Search .......... 382/232, 382/233, 245, 246, 248, 250, 251; 348/222.1, 348/231.2; 375/240.2, 240.12, 240.03, 240.27, 375/240.24; 358/1.9, 1.44; 714/768, 752; 710/30; 341/50; 345/203, 213

See application file for complete search history.

(56) References Cited

U.S. PATENT DOCUMENTS 5,764,801 A * 6/1998 Munemasa et al. ......... 382/234
5,917,947 A * 6/1999 Ishida et al. ................ 382/232
7,185,264 B2 * 2/2007 Chiba ........................ 714/768
2002/0004862 A1 * 1/2002 Horikomi et al. ............ 710/30
2002/0006228 A1 * 1/2002 Suzuki et al. ............... 382/233

FOREIGN PATENT DOCUMENTS

| JP | 10-304356 | 11/1998 |
|---|---|---|
| JP | 11-313210 | 11/1999 |
| JP | 2002-84493 | 3/2002 |
| JP | 2002-112001 | 4/2002 |

OTHER PUBLICATIONS

Japanese Office action dated Nov. 29, 2006, with partial English translation of abstract and concise explanation.

* cited by examiner

*Primary Examiner*—Matthew C. Bella
*Assistant Examiner*—Ali Bayat
(74) *Attorney, Agent, or Firm*—McGinn IP Law Group, PLLC

(57) ABSTRACT

An images combination processing system has a CCD or an imaging element including CCDs for picking up an image, compression processing portions for applying JPEG compression, etc. to image data in respective areas into which a picked-up image is divided, a buffer for storing temporarily compressed data that were processed by the compression processing portions, a compressed data combining portion for reading the compressed data being processed by respective compression processing portions from the buffer and combining them into one image file, and a storage media. Each compression processing portion has a restart marker inserting portion for inserting restart markers into the compressed data while circulating eight types of restart markers and also inserting a special restart marker into a rearmost portion of the compressed data, and a data length counter for counting a data length of the compressed data to which the restart markers are inserted.

22 Claims, 11 Drawing Sheets

IMAGES COMBINATION PROCESSING SYSTEM, IMAGES COMBINATION PROCESSING METHOD, AND IMAGES COMBINATION PROCESSING PROGRAM

BACKGROUND OF THE INVENTION

1. Field of the Invention

The present invention relates to an images combination processing system, an images combination processing method, and an images combination processing program for executing combination processing of split images.

The present invention also relates to an images combination processing system, an images combination processing method, and an images combination processing program for executing combination processing of partial images that constitutes a picked-up image.

2. Description of the Related Art

Image data of an image picked up by a digital camera or the like are often subjected to the compression process. One of compression processes is "JPEG system". However, since the compression based on the JPEG system is processed in unit of a sheet of image, a time required for the compression process is prolonged if a data size of the image is large. In particular, since the imaging devices of the digital cameras that are put nowadays on the market have a large number of pixels, the data size per one original image is large.

Therefore, in the solid state imaging device set forth in JP-A-2002-84493, the processes such as the YC conversion, the JPEG compression, etc. are applied in parallel to 2-channel output signals that are output from the solid state imaging device having left/right horizontal 2-channel outputs. Also, as shown in FIG. 15, restart markers indicated by the numbers 1 to 8 are inserted separately into JPEG data 50, 51 on each channel respectively at the time of JPEG compression process, and then two JPEG files (JPEG 0, JPEG 1) into which the restart marker are inserted are written into a memory respectively.

Then, upon generating one image file by combining these two JPEG files, each JPEG file is read in a time-series from the memory, then the reading of the JPEG file is switched when the restart marker is detected, and then the restart marker is replaced. For example, when the restart marker 1 is detected during when the JPEG 0 file is being read, the reading of the JPEG 1 file is started by switching the reading of the file, then the restart marker is replaced with the restart marker 2 when the restart marker 1 is again detected there, and then the reading of the JPEG 0 file is started. The left/right image data being divided into two JPEG files are combined by repeating above operations, so that one image is generated.

As a result, according to the solid state imaging device set forth in JP-A-2002-84493, a plurality of JPEG file images can be combined into one image. Also, since the JPEG compressing process is applied in parallel to the image data being picked up by the solid state imaging device, the processing speed can be enhanced.

JP-A-2002-84493 is known as a related art.

However, in the solid state imaging device set forth in JP-A-2002-84493, when a plurality of JPEG files are combined, the reading of the JPEG file is switched while detecting the restart marker. Therefore, the process becomes complicated, and as a consequence, it takes much time to execute the combining process.

SUMMARY OF THE INVENTION

The object of the present invention is to provide an images combination processing system, an images combination processing method, and an images combination processing program, which enables to execute combination processing of split images in a short time.

Another object of the present invention is to provide an images combination processing system, an images combination processing method, and an images combination processing program, which enables to execute combination processing of partial images that constitutes a picked-up image in a short time.

The invention provides a images combination processing system for executing combination processing of split images, having: split-image compressing means for compressing image data of each area out of a plurality of areas into which a picked-up image is split; restart marker inserting means for inserting plural types of restart markers into compressed data, which are compressed by the split-image compressing means, from a head of the compressed data in a circulatory order of the plural types, and inserting a special restart marker into a rearmost portion of the compressed data; data length counting means for counting a data length of the compressed data into which the restart markers and the special restart marker are inserted by the restart marker inserting means; compressed data storing means for storing the compressed data of each split image into which the restart markers are inserted; special restart marker detecting means for detecting the special restart marker from areas in the compressed data storing means, which are identified based on the data length counted by the data length counting means; and restart marker replacing means for reading compressed data that extend from the restart marker, which is inserted into the head of the compressed data, to the special restart marker from the compressed data storing means to replace the special restart marker with a last restart marker contained in the restart markers, wherein the split-image compressing means, the restart marker inserting means, and the data length counting means execute each process for each split image of the picked-up image, and the special restart marker detecting means and the restart marker replacing means execute each process for all split images of the picked-up image.

In this manner, the special restart marker is inserted into the rearmost portion of the compressed data and then the special restart marker is detected after the areas in the compressed data storing means, in which the compressed data are stored, are identified based on the data length. Therefore, the special restart marker can be detected effectively in a short time. As a result, the split image combining process can be executed in a short time.

Furthermore, the images combination processing system has header attaching means for attaching a header which includes information indicating the data length counted by the data length counting means, and information indicating an area of the picked-up image, where the split-image of the compressed data positions, to the compressed data into which the restart markers and the special restart marker are inserted by the restart marker inserting means; and reading-order deciding means for deciding a reading order of the compressed data by the restart marker replacing means, with reference to headers attached to the compressed data of each split image that are stored in the compressed data storing means. Therefore, the combination processing of the split images can be smoothly executed.

Furthermore, the split-image compressing means executes a compression based on a JPEG system.

The invention provides an imaging device having: image picking-up means for picking up an image; split-image compressing means for compressing image data of each area out of a plurality of areas into which a picked-up image is split; restart marker inserting means for inserting plural types of restart markers into compressed data, which are compressed by the split-image compressing means, from a head of the compressed data in a circulatory order of the plural types, and inserting a special restart marker into a rearmost portion of the compressed data; data length counting means for counting a data length of the compressed data into which the restart markers and the special restart marker are inserted by the restart marker inserting means; compressed data storing means for storing the compressed data of each split image into which the restart markers are inserted; special restart marker detecting means for detecting the special restart marker from areas in the compressed data storing means, which are identified based on the data length counted by the data length counting means; and restart marker replacing means for reading compressed data that extend from the restart marker, which is inserted into the head of the compressed data, to the special restart marker from the compressed data storing means to replace the special restart marker with a last restart marker contained in the restart markers, wherein the split-image compressing means, the restart marker inserting means, and the data length counting means execute each process for each split image of the picked-up image, and the special restart marker detecting means and the restart marker replacing means execute each process for all split images of the picked-up image.

The invention provides an images combination processing method of executing combination processing of split images, having: a split-image compressing step of compressing image data of each area out of a plurality of areas into which a picked-up image is split; a restart marker inserting step of inserting plural types of restart markers into compressed data, which are compressed by the split-image compressing step, from a head of the compressed data in a circulatory order of the plural types, and inserting a special restart marker into a rearmost portion of the compressed data; a data-length counting step of counting a data length of the compressed data into which the restart markers and the special restart marker are inserted by the restart marker inserting step; a compressed data storing step of storing the compressed data of each split image, into which the restart markers are inserted, in compressed data storing means; a special restart marker detecting step of detecting the special restart marker from areas in the compressed data storing means, which are identified based on the data length counted by the data-length counting step; and a restart marker replacing step of reading compressed data that extend from the restart marker, which is inserted into the head of the compressed data, to the special restart marker from the compressed data storing means to replace the special restart marker with a last restart marker contained in the restart markers, wherein the split-image compressing step, the restart marker inserting step, and the data-length counting step execute each process for each split image of the picked-up image, and the special restart marker detecting step and the restart marker replacing step execute each process for all split images of the picked-up image.

Furthermore, the images combination processing method has a header attaching step of attaching a header which includes information indicating the data length counted by the data-length counting step, and information indicating an area of the picked-up image, where the split-image of the compressed data positions, to the compressed data into which the restart markers and the special restart marker are inserted by the restart marker inserting step; and a reading-order deciding step of deciding a reading order of the compressed data by the restart marker replacing step, with reference to headers attached to the compressed data of each split image that are stored in the compressed data storing means.

Furthermore, the split-image compressing step executes a compression based on a JPEG system.

The invention provides an images combination processing program for executing the images combination processing method by a computer.

The invention provides an images combination processing system for executing combination processing of partial images that constitutes a picked-up image, having: partial image compressing means for compressing image data of the partial images; restart marker inserting means for inserting plural types of restart markers into compressed data, which are compressed by the partial image compressing means, from a head of the compressed data in a circulatory order of the plural types, and inserting a special restart marker into a rearmost portion of the compressed data; data length counting means for counting a data length of the compressed data into which the restart markers and the special restart marker are inserted by the restart marker inserting means; compressed data storing means for storing the compressed data of each partial image into which the restart markers are inserted; special restart marker detecting means for detecting the special restart marker from areas in the compressed data storing means that are identified based on the data length counted by the data length counting means; and restart marker replacing means for reading compressed data that extend from the restart marker, which is inserted into the head of the compressed data, to the special restart marker from the compressed data storing means to replace the special restart marker with a last restart marker contained in the restart markers, wherein the partial image compressing means, the restart marker inserting means, and the data length counting means execute each process for each partial image constituting the picked-up image, and the special restart marker detecting means and the restart marker replacing means execute each process for all partial images constituting the picked-up image.

In this manner, the special restart marker is inserted into the rearmost portion of the compressed data, and then such special restart marker is detected after areas of the compressed data storing means, in which the compressed data are stored, are identified based on the data length. Therefore, the special restart marker can be detected effectively in a short time. As a result, the combining process of a plurality of partial images constituting the picked-up image can be executed in a short time.

Furthermore, the images combination processing system has header attaching means for attaching a header which includes information indicating the data length counted by the data length counting means, and information indicating an area of the picked-up image, where the partial image of the compressed data positions, to the compressed data into which the restart markers and the special restart marker are inserted by the restart marker inserting means; and reading order deciding means for deciding an reading order of the compressed data by the restart marker replacing means, with reference to the header attached to the compressed data of each partial image that are stored in the compressed data storing means. Therefore, the combination processing of the partial images can be smoothly executed.

Furthermore, the partial image compressing means executes a compression based on a JPEG system.

The invention provides an imaging device having: an imaging element including a plurality of imaging means which pick up partial images; partial image compressing means for compressing image data of the partial images; restart marker inserting means for inserting plural types of restart markers into compressed data, which are compressed by the partial image compressing means, from a head of the compressed data in a circulatory order of the plural types, and inserting a special restart marker into a rearmost portion of the compressed data; data length counting means for counting a data length of the compressed data into which the restart markers and the special restart marker are inserted by the restart marker inserting means; compressed data storing means for storing the compressed data of each partial image into which the restart markers are inserted; special restart marker detecting means for detecting the special restart marker from areas in the compressed data storing means that are identified based on the data length counted by the data length counting means; and restart marker replacing means for reading compressed data that extend from the restart marker, which is inserted into the head of the compressed data, to the special restart marker from the compressed data storing means to replace the special restart marker with a last restart marker contained in the restart markers, wherein the partial image compressing means, the restart marker inserting means, and the data length counting means execute each process for each partial image constituting the picked-up image, and the special restart marker detecting means and the restart marker replacing means execute each process for all partial images constituting the picked-up image.

The invention provides an images combination processing method of executing a combining processing of partial images that constitutes a picked-up image, having: a partial image compressing step of compressing image data of the partial images; a restart marker inserting step of inserting plural types of restart markers into compressed data, which are compressed by the partial image compressing step, from a head of the compressed data in a circulatory order of the plural types, and inserting a special restart marker into a rearmost portion of the compressed data; a data length counting step of counting a data length of the compressed data into which the restart markers and the special restart marker are inserted by the restart marker inserting step; a compressed data storing step of storing the compressed data of each partial image, into which the restart markers are inserted, in compressed data storing means; a special restart marker detecting step of detecting the special restart marker from areas in the compressed data storing means that are identified based on the data length counted by the data length counting step; and a restart marker replacing step of reading compressed data that extend from the restart marker, which is inserted into the head of the compressed data, to the special restart marker from the compressed data storing step to replace the special restart marker with a last restart marker contained in the restart markers, wherein the partial image compressing step, the restart marker inserting step, and the data length counting step execute each process for each partial image constituting the picked-up image, and the special restart marker detecting step and the restart marker replacing step execute each process for all partial images constituting the picked-up image.

Furthermore, the images combination processing method has a header attaching step of attaching a header which includes information indicating the data length counted by the data length counting step, and information indicating an area of the picked-up image, where the partial image of the compressed data positions, to the compressed data into which the restart markers and the special restart marker are inserted by the restart marker inserting step; and a reading order deciding step of deciding an reading order of the compressed data by the restart marker replacing step, with reference to the header attached to the compressed data of each partial image that are stored in the compressed data storing step.

Furthermore, the partial image compressing step executes a compression based on a JPEG system.

The invention provides an images combination processing program for executing the images combination processing method by a computer.

The invention provides an images combination processing system for executing combination processing of split images, having: split-image compressing portion which compresses image data of each area out of a plurality of areas into which a picked-up image is split; restart marker inserting portion which inserts plural types of restart markers into compressed data, which are compressed by the split-image compressing portion, from a head of the compressed data in a circulatory order of the plural types, and inserting a special restart marker into a rearmost portion of the compressed data; data length counting portion which counts a data length of the compressed data into which the restart markers and the special restart marker are inserted by the restart marker inserting portion; compressed data storing portion which stores the compressed data of each split image into which the restart markers are inserted; special restart marker detecting portion which detects the special restart marker from areas in the compressed data storing portion, which are identified based on the data length counted by the data length counting portion; and restart marker replacing portion which reads compressed data that extend from the restart marker, which is inserted into the head of the compressed data, to the special restart marker from the compressed data storing portion to replace the special restart marker with a last restart marker contained in the restart markers, wherein the split-image compressing portion, the restart marker inserting portion, and the data length counting portion execute each process for each split image of the picked-up image, and the special restart marker detecting portion and the restart marker replacing portion execute each process for all split images of the picked-up image.

Furthermore, the images combination processing system has: header attaching portion which attaches a header which includes information indicating the data length counted by the data length counting portion, and information indicating an area of the picked-up image, where the split-image of the compressed data positions, to the compressed data into which the restart markers and the special restart marker are inserted by the restart marker inserting portion; and reading-order deciding portion which decides a reading order of the compressed data by the restart marker replacing portion, with reference to headers attached to the compressed data of each split image that are stored in the compressed data storing portion.

Furthermore, the split-image compressing portion executes a compression based on a JPEG system.

The invention provides an images combination processing system for executing combination processing of partial images that constitutes a picked-up image, having: partial image compressing portion which compresses image data of the partial images; restart marker inserting portion which inserts plural types of restart markers into compressed data, which are compressed by the partial image compressing portion, from a head of the compressed data in a circulatory order of the plural types, and inserting a special restart marker into a rearmost portion of the compressed data; data length counting portion which counts a data length of the compressed data into which the restart markers and the special restart marker are inserted by the restart marker inserting portion; compressed data storing portion which stores the compressed data of each partial image into which the restart markers are inserted; special restart marker detecting portion for detecting the special restart marker from areas in the compressed data storing portion that are identified based on the data length counted by the data length counting portion; and restart marker replacing portion which reads compressed data that extend from the restart marker, which is inserted into the head of the compressed data, to the special restart marker from the compressed data storing portion to replace the special restart marker with a last restart marker contained in the restart markers, wherein the partial image compressing portion, the restart marker inserting portion, and the data length counting portion execute each process for each partial image constituting the picked-up image, and the special restart marker detecting portion and the restart marker replacing portion execute each process for all partial images constituting the picked-up image.

Furthermore, the images combination processing system has: header attaching portion which attaches a header which includes information indicating the data length counted by the data length counting portion, and information indicating an area of the picked-up image, where the partial image of the compressed data positions, to the compressed data into which the restart markers and the special restart marker are inserted by the restart marker inserting portion; and reading order deciding portion which decides an reading order of the compressed data by the restart marker replacing portion, with reference to the header attached to the compressed data of each partial image that are stored in the compressed data storing portion.

Furthermore, the partial image compressing portion executes a compression based on a JPEG system.

DETAILED DESCRIPTION OF THE PREFERRED EMBODIMENTS

Embodiments of an images combination processing system and an images combination processing method according to the present invention will be explained in detail with reference to the drawings hereinafter. In the following, explanation will be made with an imaging device such as a digital camera having CCD, a digital video as an example of the images combination processing system and the imaging means of the embodiments. In this case, a storage media such as a small memory card is installed into this imaging device.

Also, in the following, the images combination processing system and the images combination processing method according to the present invention will be explained in detail. In this case, explanation of an images combination processing program according to the present invention is contained in the explanation of the images combination processing method given hereunder because such program is applied to execute the images combination processing method.

First Embodiment

Figure 1:
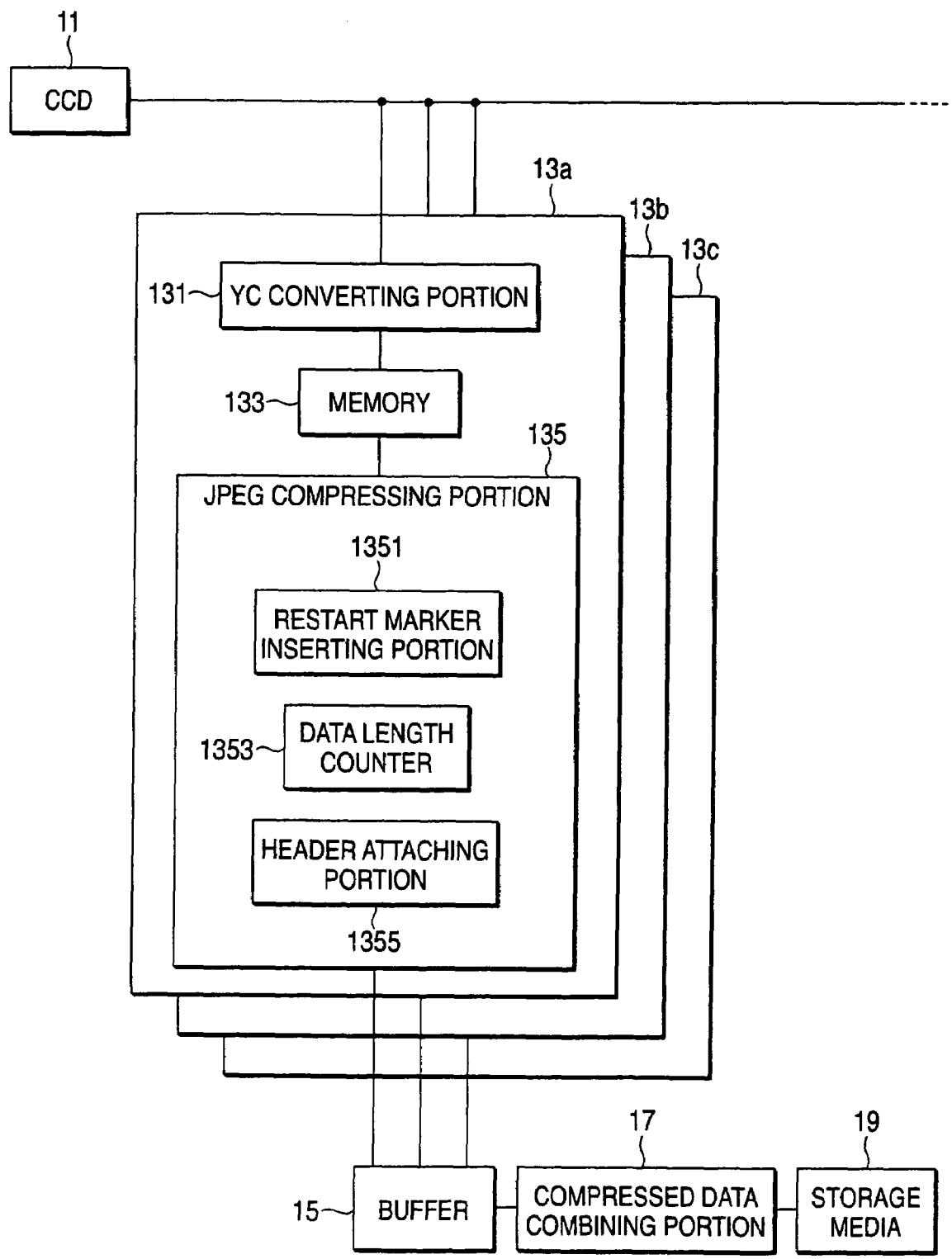
FIG. 1 is a block diagram showing an imaging device of an embodiment according to the present invention.

FIG. 1 is a block diagram showing an imaging device of a first embodiment. As shown in FIG. 1, the imaging device of the first embodiment has a CCD 11 corresponding to imaging means, three compression processing portions 13a to 13c, a buffer 15 corresponding to compressed data storing means, a compressed data combining portion 17 corresponding to special restart marker detecting means, restart marker replacing means and reading-order deciding means, and a storage media 19. Each of the compression processing portions 13a to 13c includes a YC converting portion 131, a memory 133, and a JPEG compressing portion 135 corresponding to split-image compressing means. The JPEG compressing portion 135 has a restart marker inserting portion 1351 corresponding to restart marker inserting means, a data length counter 1353 corresponding to data-length counting means, and a header attaching portion 1355 corresponding to header attaching means.

Constituent elements of the imaging device of the first embodiment will be explained hereunder.

The CCD 11 is solid state imaging means for picking up an image, which outputs image data of a picked-up image in series. The compression processing portions 13a to 13c execute JPEG compression and so on for image data of each area into which the image picked up by the CCD 11 is split. Each of the compression processing portions 13a to 13c reads image data of concerned area by referring to the vertical synchronizing signal of the image data being fed from the CCD 11.

Figure 2:
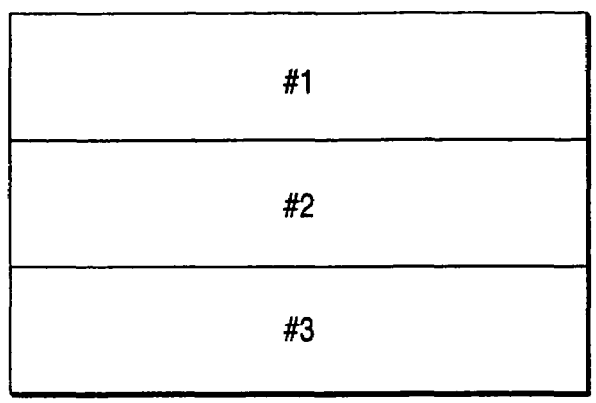
FIG. 2 is an image view of an image that is divided into three areas #1 to #3.

In the present embodiment, since three compression processing portions 13*a* to 13*c* are provided, an image is divided into three areas #1 to #3, as shown in FIG. 2. The compression processing portion 13*a* execute the processing for image data of the area #1, the compression processing portion 13*b* execute the processing for image data of the area #2, and the compression processing portion 13*c* execute the processing for image data of the area #3.

Constituent elements of the compression processing portion 13 will be explained hereunder. The YC converting portion 131 converts RGB or CMY image data of concerned area into luminance component (Y) data and color component (C) data. The memory 133 temporarily stores image data that were subjected to the YC conversion. The JPEG compressing portion 135 reads image data from the memory 133 to execute the JPEG compression. In the JPEG compressing, a restart marker is inserted into compressed data by the restart marker inserting portion 1351, a data length of the compressed data into which the restart marker is inserted is counted by the data length counter 1353, and a header is attached to each compressed data by the header attaching portion 1355.

Figure 3:
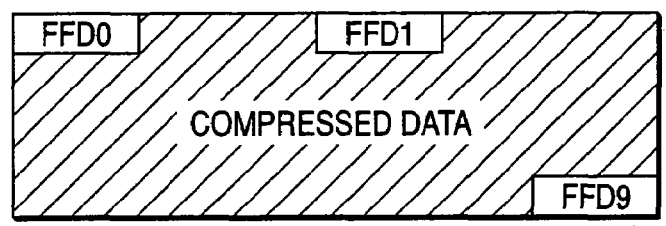
FIG. 3 is an image view of compressed data into which restart markers are inserted.

More particularly, the restart marker inserting portion 1351 inserts one of restart markers of eight type (FFD0 to FFD7) in turn, into the compressed data. In particular, in the present embodiment, a special restart marker FFD9 is inserted into a rearmost portion of the compressed data. An image view of the compressed data into which the restart markers are inserted is shown in FIG. 3. The data length counter 1353 counts a data length of the compressed data into which the restart markers are inserted by the restart marker inserting portion 1351. The header attaching portion 1355 creates a header containing the information which indicates the data length counted by the data length counter 1353 to attach the header to the compressed data. The header also contains information indicating to which position of the picked-up image the split-image of the concerned compressed data belongs as well as the information indicating the data length.

Figure 4:
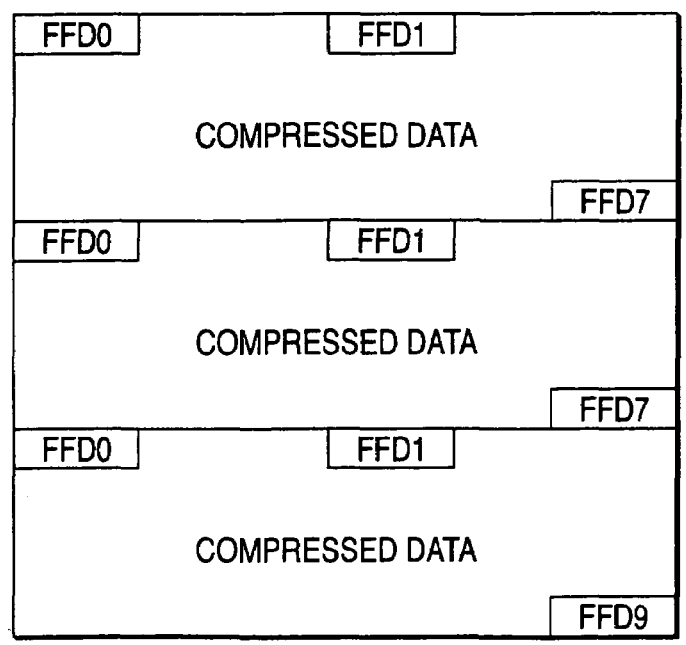
FIG. 4 is an image view of compressed data in which a special restart marker FFD9 is replaced with a general restart marker FFD7.

The buffer 15 temporarily stores compressed data processed by each of compression processing portions 13*a* to 13*c*. The compressed data combining portion 17 reads the compressed data processed by compression processing portions 13*a* to 13*c* from the buffer 15 to combine them into one image file. More specifically, the compressed data combining portion 17 firstly decides a reading order of the compressed data by referring to headers of respective compressed data. Then, the compressed data combining portion 17 detects a special restart marker FFD9 by identifying and scanning areas corresponding to the data length in the buffer 15 based on the information contained in the headers of the compressed data and indicating a data length, in the decided order. Next, the compressed data combining portion 17 reads the compressed data extending from the head restart marker FFD0 to the special restart marker FFD9 in the split image from the buffer 15, and then replaces the special restart marker FFD9 with a normal restart marker FFD7, as shown in FIG. 4. In this case, the restart marker FFD9 of the compressed data that is lastly read may not be replaced.

In this manner, if operations of detecting the special restart marker FFD9 by scanning the specified areas in the buffer 15 based on the information indicating the data length in the decided order, then reading the compressed data having the restart markers FFD0 to FFD9 from the buffer 15, and replacing the special restart marker FFD9 with the restart marker FFD7 are carried out, all compressed data are finally combined to produce one image file. A header of the combined image file is created based on the headers attached by the header attaching portion 1355 of the compression processing portion 13 and is attached to the image file. The compressed data combining portion 17 includes a memory (not shown) for storing the data generated in the course of the combination.

The storage media 19 is a recording media for storing the image file that is combined by the compressed data combining portion 17 in this manner. When the image file stored in the storage media 19 is to be displayed on a display portion (not shown), such image file is read from the storage media 19 and is expanded by a JPEG expanding portion (not shown) and displayed.

Figure 5:
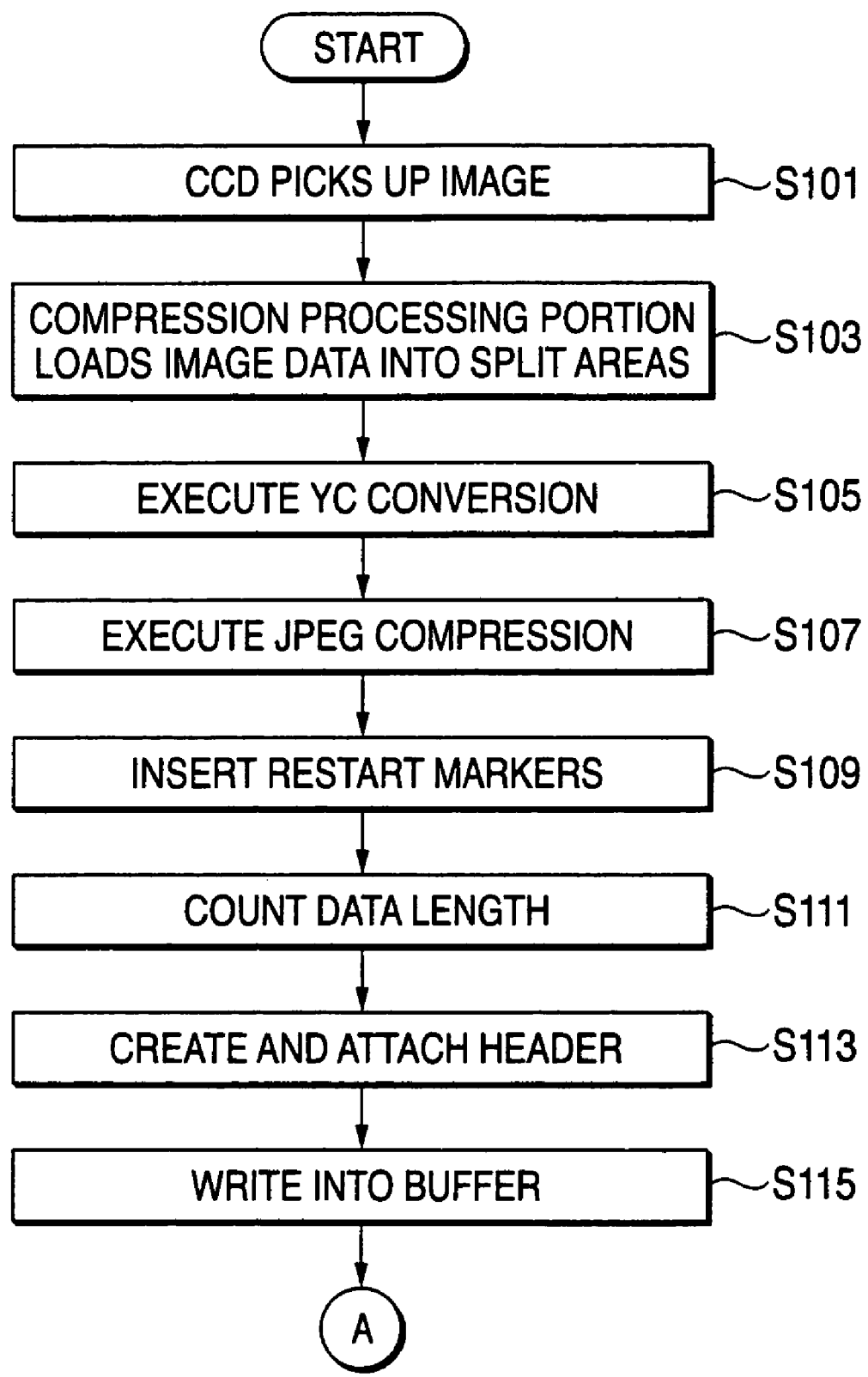
FIG. 5 is a flowchart explaining an operation of the imaging device of the embodiment according to the present invention.
Figure 6:
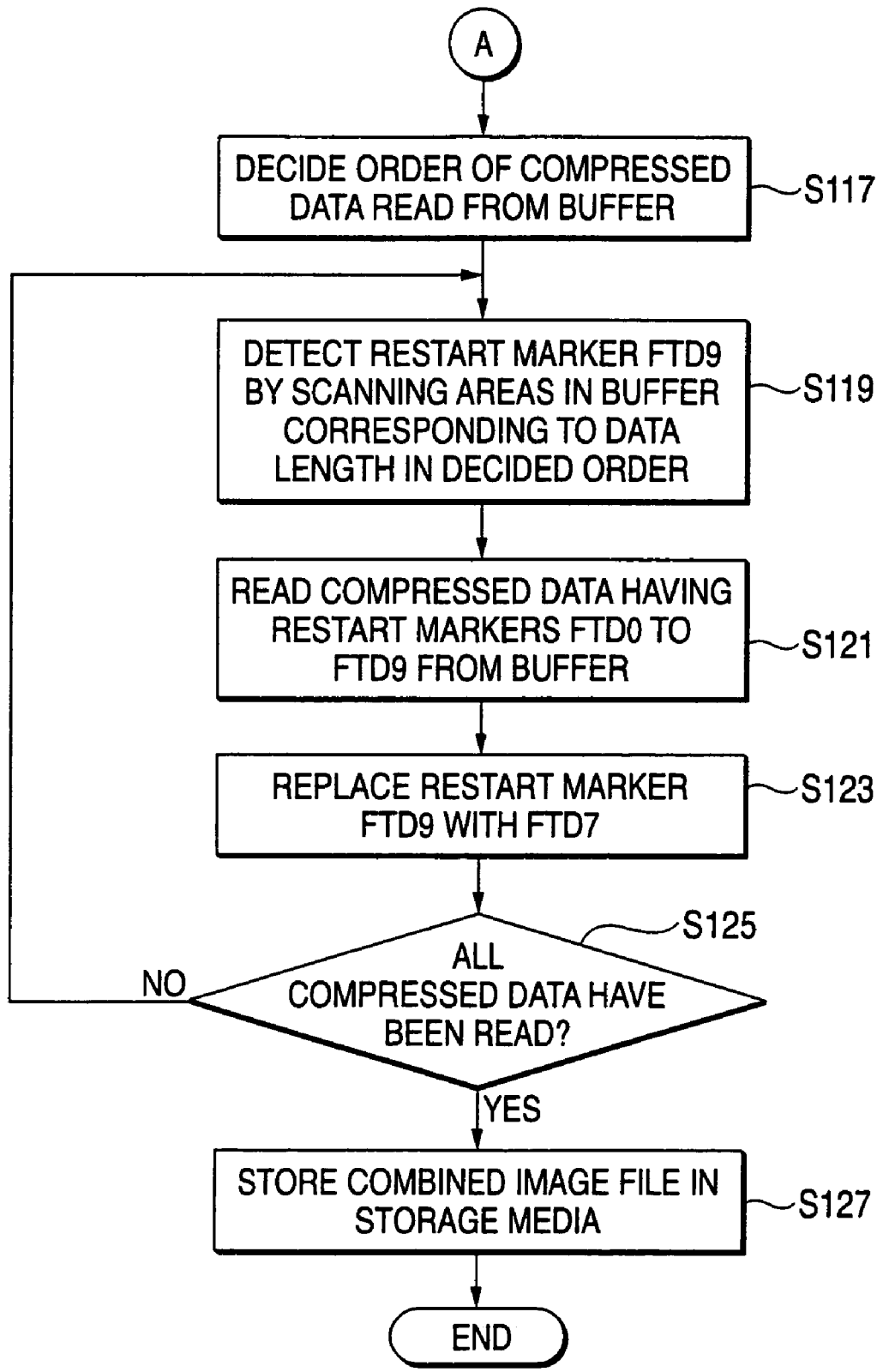
FIG. 6 is a flowchart explaining the operation of the imaging device of the embodiment according to the present invention.

Next, an operation of the imaging device (the images combination processing method) of the first embodiment will be explained briefly with reference to FIG. 5 and FIG. 6 hereunder. FIG. 5 and FIG. 6 are flowcharts explaining an operation of the imaging device of the first embodiment. First, in step S101, the CCD 11 picks up the image. Then, in step S103, each of the compression processing portions 13*a* to 13*c* loads the image data picked up by the CCD 11 into each split area. Steps S105 to S115 explained hereunder are steps executed in parallel by respective compression processing portions 13*a* to 13*c*. In step S105, the YC converting portion 131 executes the YC conversion of the read image data. Then, in step S107, the JPEG compressing portion 135 executes the JPEG compression for the image data that was subjected to the YC conversion.

Then, in step S109, the restart marker inserting portion 1351 inserts the restart markers into the compressed data. Then, in step S111, the data length counter 1353 counts a data length of the compressed data into which the restart markers are inserted. Then, in step S113, the header attaching portion 1355 creates a header including the information indicating the data length being counted in step S111, and then attaches the header to the compressed data. Then, in step S115, the compressed data being processed by the compression processing portion 13 are written into the buffer 15.

Then, in step S117, an order of reading compressed data from the buffer 15 is decided by referring to the headers of respective compressed data. Then, in step S119, the special restart marker FFD9 is detected by scanning the areas in the buffer 15 corresponding to a data length of the compressed data as the object to be read, in the order decided in step S117. Then, in step S121, the compressed data having the head restart marker FFD0 to the special restart marker FFD9 are read from the buffer 15. Then, in step S123, the special restart marker FFD9 is replaced with the normal restart marker FFD7.

Then, in step S125, it is decided whether or not all the compressed data necessary for the combination have been read. If all the compressed data have been read (if YES), the process goes to step S127. In contrast, unless all the compressed data have been read (if NO), the process goes back to step S119. Then, in step S127, the combined image file is stored in the storage media 19, and then a series of processes are ended.

As explained as above, in the imaging device containing the images combination processing system and the images combination processing method of the first embodiment, the special restart marker FFD9 which indicates the rearmost portion of the compressed data is prepared as one of the restart markers that are inserted into the compressed data, and then such special restart marker FFD9 is detected after the scanned areas in the buffer 15 are identified on the basis of the information indicating the data length. In this manner, since the scanned areas in the buffer 15 are restricted into the particular areas, the special restart marker FFD9 can be effectively detected in a short time. As a result, the image combining process can be executed in a short time. Also, since the compressing process can be executed in parallel after the image data are spited and also the combining process thereof can be executed in a short time, the image data can be written into the storage media 19 in a short time even though a data size per one original image is large. In the present embodiment, although the data length is recited in the header, the data length counter information may be transmitted directly to the compressed data combining portion 17.

Figure 7:
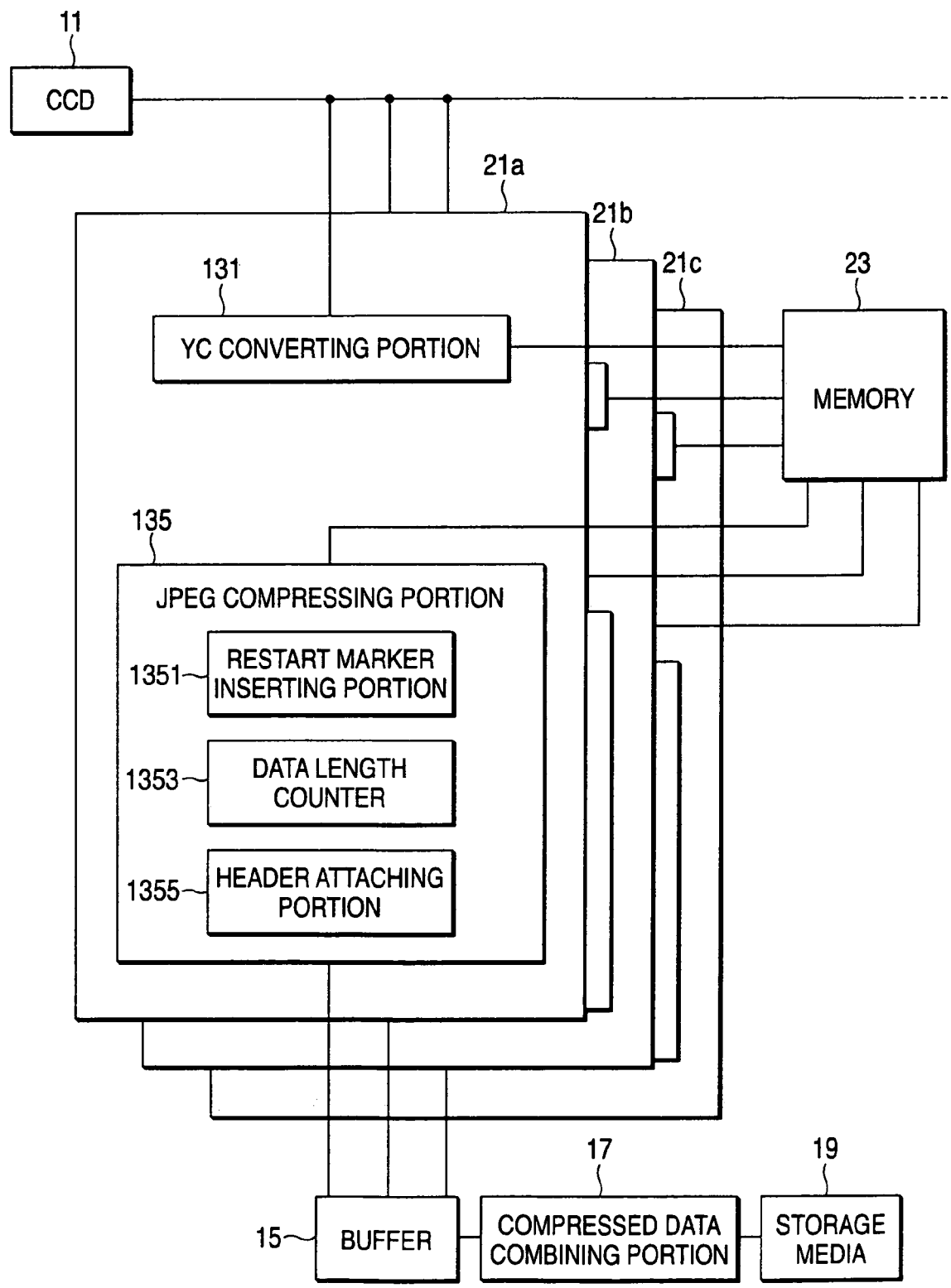
FIG. 7 is a block diagram showing an imaging device of another embodiment according to the present invention.

In the present embodiment, although the memory 133 for storing temporarily the image data, which was subjected to the YC conversion, is provided to respective compression processing portions 13a to 13c, a single memory 23 may be provided in common to respective compression processing portions 21a to 21c as shown in FIG. 7. Also, in FIG. 1, the buffer 15 may be used commonly to the memory 133.

Second Embodiment

Figure 8:
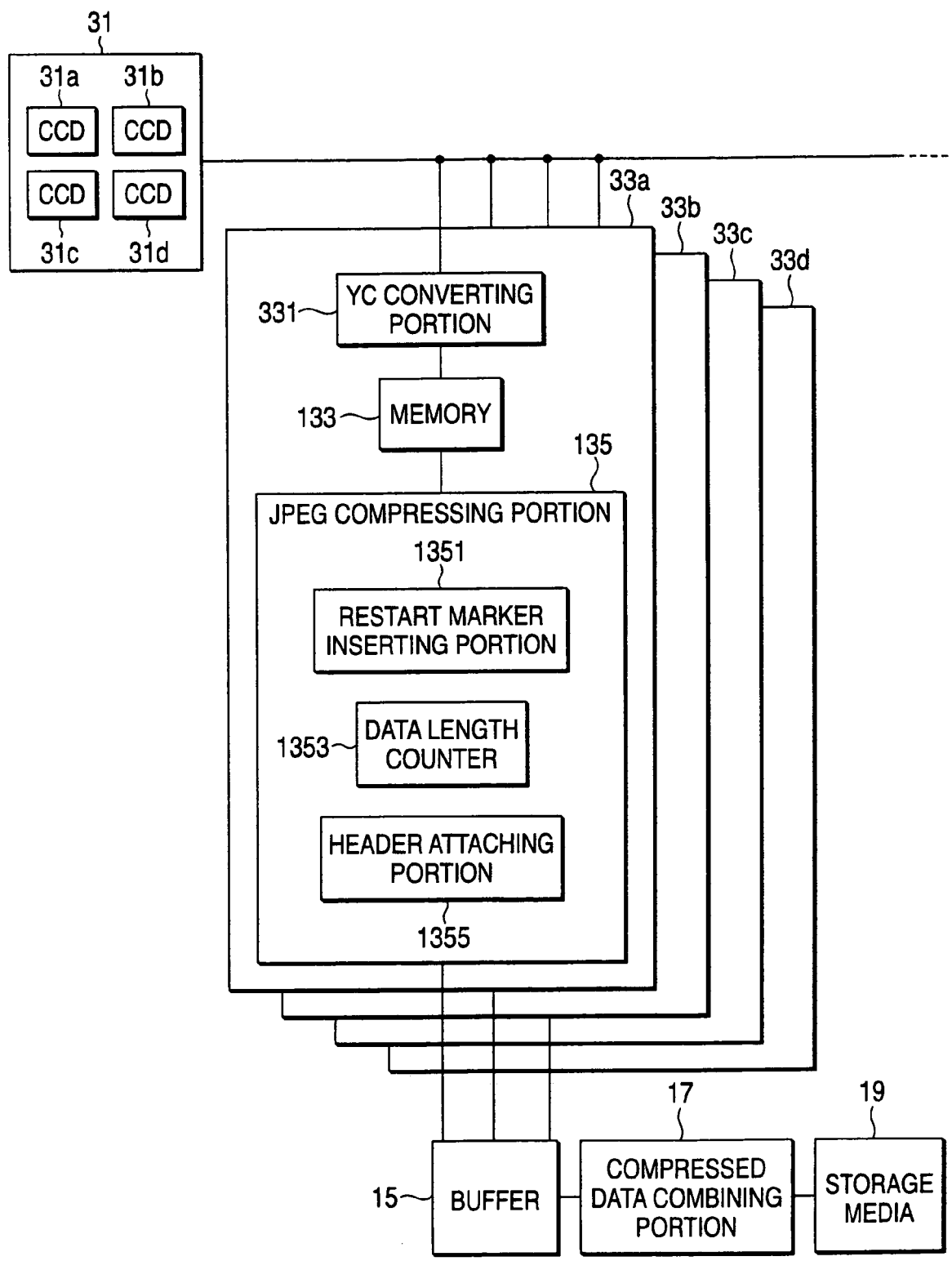
FIG. 8 is a block diagram showing an imaging device of an embodiment according to the present invention.

FIG. 8 is a block diagram showing an imaging device of a second embodiment. As shown in FIG. 8, the imaging device of the second embodiment has an imaging element 31, four compression processing portions 33a to 33d, a buffer 15 corresponding to compressed data storing means, a compressed data combining portion 17 corresponding to special restart marker detecting means, restart marker replacing means and reading order deciding means, and a storage media 19. Each of the compression processing portions 33a to 33d is includes a YC converting portion 331, a memory 133, and a JPEG compressing portion 135 corresponding to partial image compressing means. The JPEG compressing portion 135 has a restart marker inserting portion 1351 corresponding to restart marker inserting means, a data-length counter 1353 corresponding to data length counting means, and a header attaching portion 1355 corresponding to header attaching means.

Next, respective constituent elements that the imaging device of the present embodiment includes will be explained hereunder.

Figure 9:
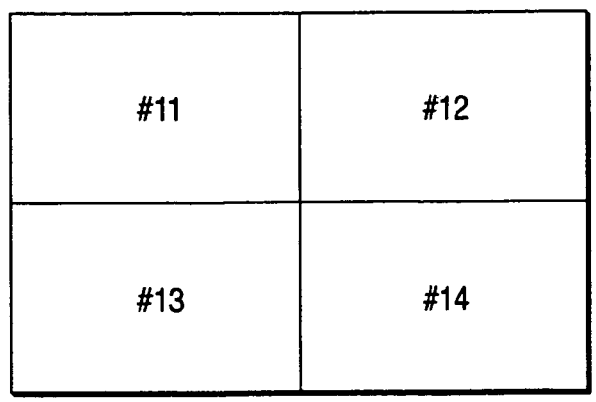
FIG. 9 is an image view of an image that is constructed by four partial images that are picked up by an imaging element.

First, the imaging element 31 is a solid state imaging element for picking up an image, which is constructed by four CCDs 31a to 31d corresponding to imaging means. As shown in FIG. 9, a image is obtained by combining partial images #11 to #14 that are respectively picked up by CCDs 31a to 31d. The compression processing portions 33a to 33d execute JPEG compression and so on for image data of the partial images that are picked up by respective CCDs 31a to 31d of the imaging element 31. In the present embodiment, the compression processing portion 33a executes the JPEG compression and so on for the image data of the partial image picked up by the CCD 31a. Similarly, the compression processing portion 33b executes the JPEG compression and so on for the image data of the partial image picked up by the CCD 31b, the compression processing portion 33c executes the JPEG compression and so on for the image data of the partial image picked up by the CCD 31c, and the compression processing portion 33d executes the JPEG compression and so on for the image data of the partial image picked up by the CCD 31d.

Constituent elements of the compression processing portion 33 will be explained hereunder. The YC converting portion 331 converts RGB or CMY image data of concerned CCD 31 into luminance component (Y) data and color component (C) data. The memory 133 temporarily stores image data that were subjected to the YC conversion. The JPEG compressing portion 135 reads image data from the memory 133 to execute the JPEG compression. In the JPEG compressing, a restart marker is inserted into compressed data by the restart marker inserting portion 1351, a data length of the compressed data into which the restart marker is inserted is counted by the data length counter 1353, and a header is attached to each compressed data by the header attaching portion 1355.

Figure 10:
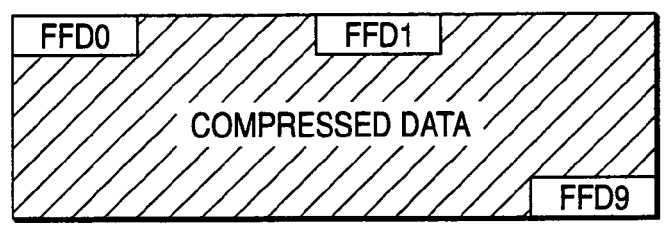
FIG. 10 is an image view of compressed data into which restart markers are inserted.

More particularly, the restart marker inserting portion 1351 inserts one of restart markers of eight type (FFD0 to FFD7) in turn, into the compressed data. In particular, in the present embodiment, a special restart marker FFD9 is inserted into a rearmost portion of the compressed data. An image view of the compressed data into which the restart markers are inserted is shown in FIG. 10. The data length counter 1353 counts a data length of the compressed data into which the restart markers are inserted by the restart marker inserting portion 1351. The header attaching portion 1355 creates a header containing the information which indicates the data length counted by the data length counter 1353 to attach the header to the compressed data. The header also contains information indicating to which position of the picked-up image the split-image of the concerned compressed data belongs as well as the information indicating the data length.

Figure 11:
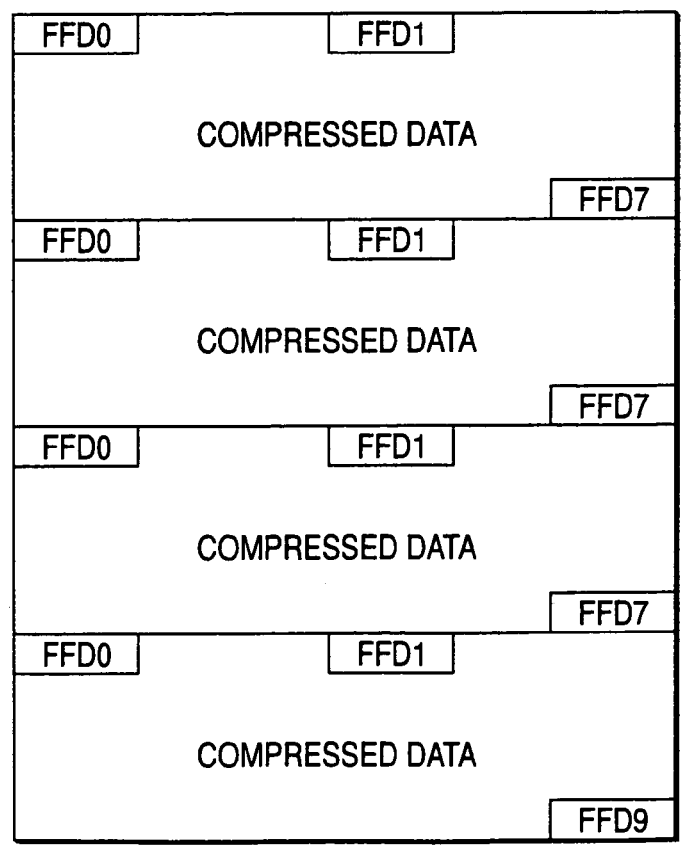
FIG. 11 is an image view of compressed data in which a special restart marker FFD9 is replaced with a general restart marker FFD7.

The buffer 15 temporarily stores compressed data processed by each of compression processing portions 33a to 33d. The compressed data combining portion 17 reads the compressed data processed by compression processing portions 33a to 33d from the buffer 15 to combine them into one image file. More specifically, the compressed data combining portion 17 firstly decides a reading order of the compressed data by referring to headers of respective compressed data. Then, the compressed data combining portion 17 detects a special restart marker FFD9 by identifying and scanning areas corresponding to the data length in the buffer 15 based on the information contained in the headers of the compressed data and indicating a data length, in the decided order. Next, the compressed data combining portion 17 reads the compressed data extending from the head restart marker FFD0 to the special restart marker FFD9 in the split image from the buffer 15, and then replaces the special restart marker FFD9 with a normal restart marker FFD7, as shown in FIG. 11.

In this manner, if operations of detecting the special restart marker FFD9 by scanning the specified areas in the buffer 15 based on the information indicating the data length in the decided order, then reading the compressed data having the restart markers FFD0 to FFD9 from the buffer 15, and replacing the special restart marker FFD9 with the restart marker FFD7 are carried out, all compressed data are finally combined to produce one image file. A header of the combined image file is created based on the headers attached by the header attaching portion 1355 of the compression processing portion 33 and is attached to the image file. The compressed data combining portion 17 includes a memory (not shown) for storing the data generated in the course of the combination.

The storage media 19 is a recording media for storing the image file that is combined by the compressed data combining portion 17 in this manner. When the image file stored in the storage media 19 is to be displayed on a display portion (not shown), such image file is read from the storage media 19 and is expanded by a JPEG expanding portion (not shown) and displayed.

Figure 12:
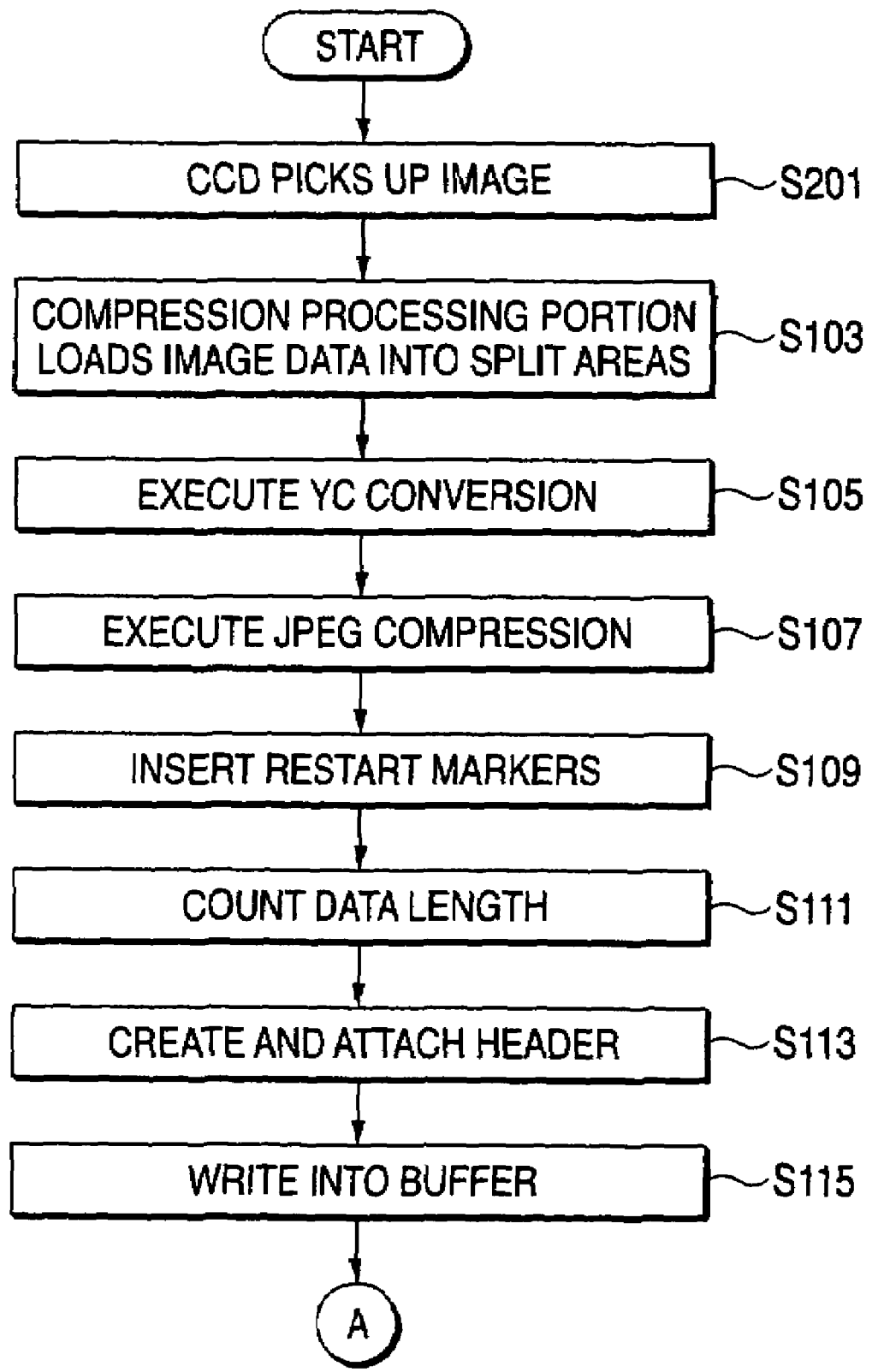
FIG. 12 is a flowchart explaining an operation carried out by the imaging device of the embodiment according to the present invention.
Figure 13:
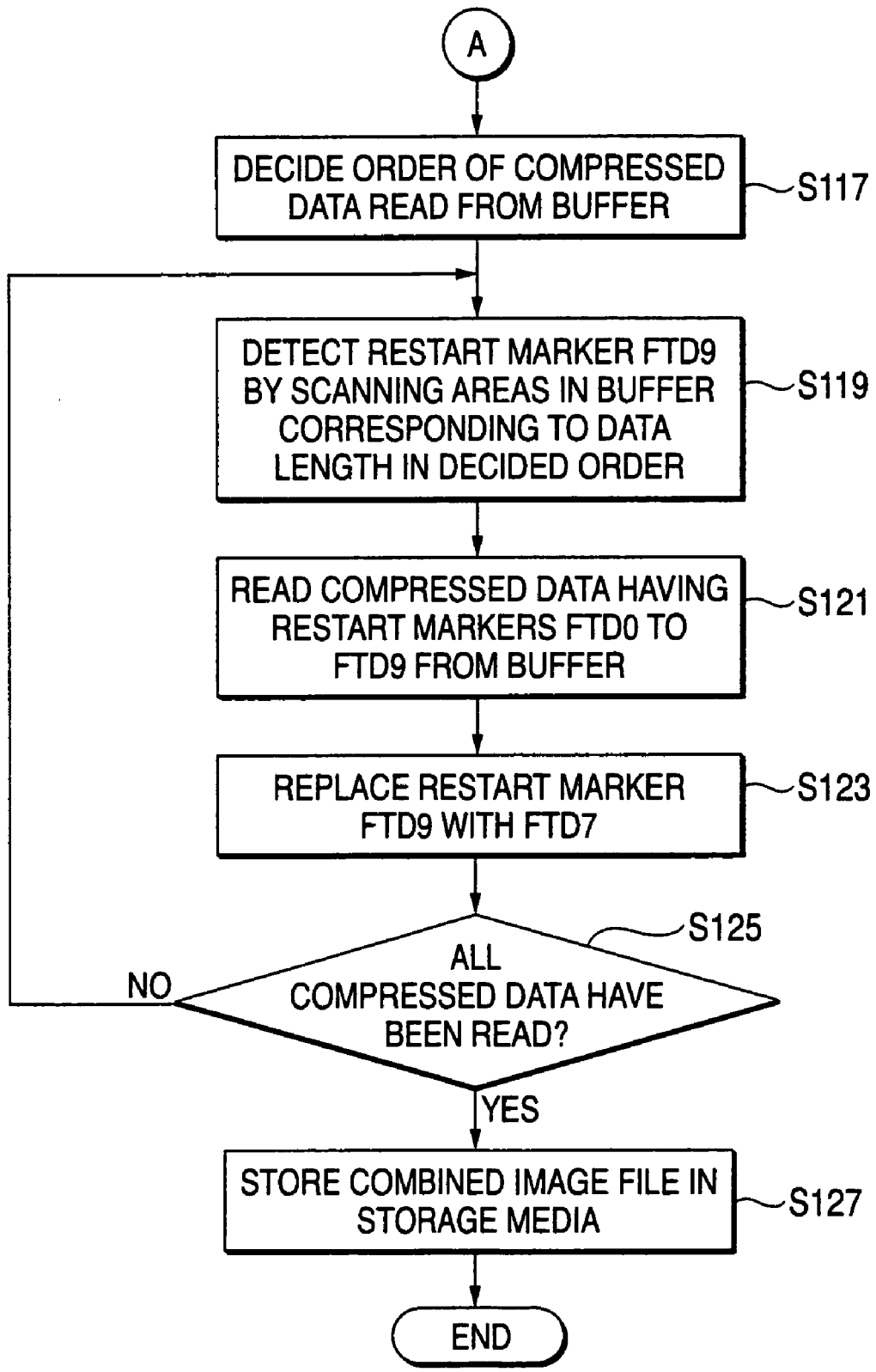
FIG. 13 is a flowchart explaining the operation carried out by the imaging device of the embodiment according to the present invention.

Next, an operation of the imaging device (the images combination processing method) of the first embodiment will be explained briefly with reference to FIG. 12 and FIG. 13 hereunder. FIG. 12 and FIG. 13 are flowcharts explaining an operation of the imaging device of the first embodiment. First, in step S201, the imaging element 31 picks up the image. Then, in step S103, each of the compression processing portions 33a to 33d loads the image data from corresponding CCDs 31a to 31d of the imaging element 31. Steps S105 to S115 explained hereunder are steps executed in parallel by respective compression processing portions 33a to 33d. In step S105, the YC-converting portion 331 executes the YC conversion of the read image data. Then, in step S107, the JPEG compressing portion 135 executes the JPEG compression for the image data that was subjected to the YC conversion.

Then, in step S109, the restart marker inserting portion 1351 inserts the restart markers into the compressed data. Then, in step S111, the data length counter 1353 counts a data length of the compressed data into which the restart markers are inserted. Then, in step S113, the header attaching portion 1355 creates a header including the information indicating the data length being counted in step S111, and then attaches the header to the compressed data. Then, in step S115, the compressed data being processed by the compression processing portion 33 are written into the buffer 15.

Then, in step S117, an order of reading compressed data from the buffer 15 is decided by referring to the headers of respective compressed data. Then, in step S119, the special restart marker FFD9 is detected by scanning the areas in the buffer 15 corresponding to a data length of the compressed data as the object to be read, in the order decided in step S117. Then, in step S121, the compressed data having the head restart marker FFD0 to the special restart marker FFD9 are read from the buffer 15. Then, in step S123, the special restart marker FFD9 is replaced with the normal restart marker FFD7.

Then, in step S125, it is decided whether or not all the compressed data necessary for the combination have been read. If all the compressed data have been read (if YES), the process goes to step S127. In contrast, unless all the compressed data have been read (if NO), the process goes back to step S119. Then, in step S127, the combined image file is stored in the storage media 19, and then a series of processes are ended.

As described above, in imaging device containing the images combination processing system, and the images combination processing method of the second embodiment, the special restart marker FFD9 which indicates the rearmost portion of the compressed data is prepared as one of the restart markers that are inserted into the compressed data, and then such special restart marker FFD9 is detected after the scanned areas in the buffer 15 are identified on the basis of the information indicating the data length. In this manner, since the scanned areas in the buffer 15 are restricted into the particular areas, the special restart marker FFD9 can be effectively detected in a short time. As a result, the combining process of the partial images picked up by the imaging element 31 consisting of a plurality of CCDs 31a to 31d can be executed in a short time. Also, since the image data picked up by CCDs 31a to 31d are subjected to the compression process in parallel and also the combining process thereof can be executed in a short time, the image data can be written into the storage media 19 in a short time even though a data size per one original image is large.

Figure 14:
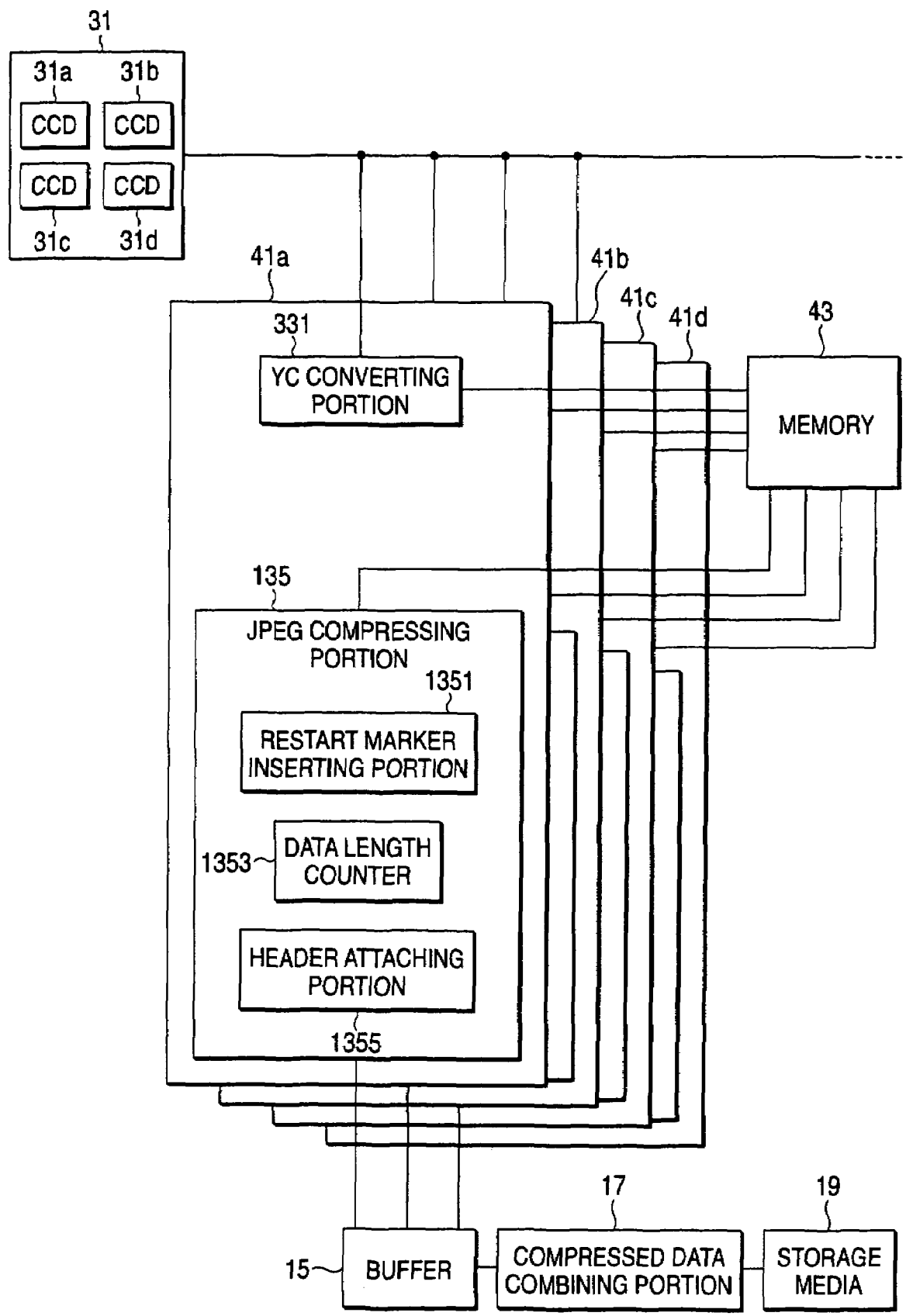
FIG. 14 is a block diagram showing an imaging device of another embodiment according to the present invention.
Figure 15:
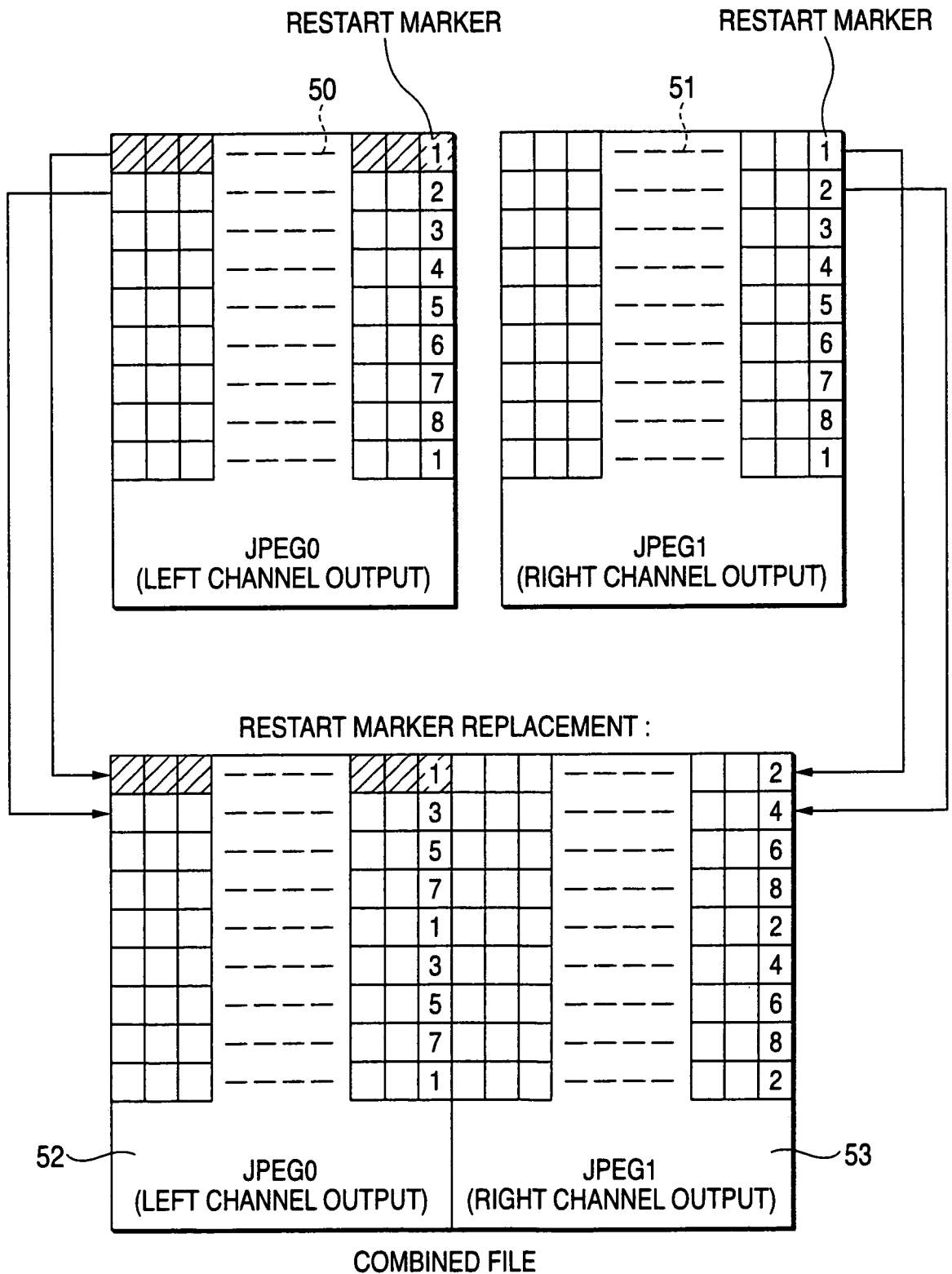
FIG. 15 is a memory image view of a restart marker replacing operation executed by the solid state imaging device set forth in JP-A-2002-84493.

In the present embodiment, although the memory 133 for storing temporarily the image data, which was subjected to the YC conversion, is provided to respective compression processing portions 33a to 33d, a single memory 43 may be provided in common to respective compression processing portions 41a to 41d as shown in FIG. 14.

What is claimed is:

1. An images combination processing system for executing combination processing of split images, comprising:
   split-image compressing means for compressing image data of each area out of a plurality of areas into which a picked-up image is split;
   restart marker inserting means for inserting plural types of restart markers into compressed data, which are compressed by the split-image compressing means, from a head of the compressed data in a circulatory order of the plural types, and inserting a special restart marker into a rearmost portion of the compressed data;
   data length counting means for counting a data length of the compressed data into which the restart markers and the special restart marker are inserted by the restart marker inserting means;
   compressed data storing means for storing the compressed data of each split image into which the restart markers are inserted;
   special restart marker detecting means for detecting the special restart marker from areas in the compressed data storing means, which are identified based on the data length counted by the data length counting means; and
   restart marker replacing means for reading compressed data that extend from the restart marker, which is inserted into the head of the compressed data, to the special restart marker from the compressed data storing means to replace the special restart marker with a last restart marker contained in the restart markers,
   wherein the split-image compressing means, the restart marker inserting means, and the data length counting means execute each process for each split image of the picked-up image, and
   the special restart marker detecting means and the restart marker replacing means execute each process for all split images of the picked-up image.

2. The images combination processing system according to claim 1, further comprising:
   header attaching means for attaching a header which includes information indicating the data length counted by the data length counting means, and information indicating an area of the picked-up image, where the split-image of the compressed data positions, to the compressed data into which the restart markers and the special restart marker are inserted by the restart marker inserting means; and
   reading-order deciding means for deciding a reading order of the compressed data by the restart marker replacing means, with reference to headers attached to the compressed data of each split image that are stored in the compressed data storing means.

3. The images combination processing system according to claim 1, wherein the split-image compressing means executes a compression based on a JPEG system.

4. An imaging device comprising:
   image picking-up means for picking up an image;

split-image compressing means for compressing image data of each area out of a plurality of areas into which a picked-up image is split;

restart marker inserting means for inserting plural types of restart markers into compressed data, which are compressed by the split-image compressing means, from a head of the compressed data in a circulatory order of the plural types, and inserting a special restart marker into a rearmost portion of the compressed data;

data length counting means for counting a data length of the compressed data into which the restart markers and the special restart marker are inserted by the restart marker inserting means;

compressed data storing means for storing the compressed data of each split image into which the restart markers are inserted;

special restart marker detecting means for detecting the special restart marker from areas in the compressed data storing means, which are identified based on the data length counted by the data length counting means; and restart marker replacing means for reading compressed data that extend from the restart marker, which is inserted into the head of the compressed data, to the special restart marker from the compressed data storing means to replace the special restart marker with a last restart marker contained in the restart markers, wherein the split-image compressing means, the restart marker inserting means, and the data length counting means execute each process for each split image of the picked-up image, and the special restart marker detecting means and the restart marker replacing means execute each process for all split images of the picked-up image.

5. An images combination processing method of executing combination processing of split images, comprising:

a split-image compressing step of compressing image data of each area out of a plurality of areas into which a picked-up image is split;

a restart marker inserting step of inserting plural types of restart markers into compressed data, which are compressed by the split-image compressing step, from a head of the compressed data in a circulatory order of the plural types, and inserting a special restart marker into a rearmost portion of the compressed data;

a data-length counting step of counting a data length of the compressed data into which the restart markers and the special restart marker are inserted by the restart marker inserting step;

a compressed data storing step of storing the compressed data of each split image, into which the restart markers are inserted, in compressed data storing means;

a special restart marker detecting step of detecting the special restart marker from areas in the compressed data storing means, which are identified based on the data length counted by the data-length counting step; and a restart marker replacing step of reading compressed data that extend from the restart marker, which is inserted into the head of the compressed data, to the special restart marker from the compressed data storing means to replace the special restart marker with a last restart marker contained in the restart markers, wherein the split-image compressing step, the restart marker inserting step, and the data-length counting step execute each process for each split image of the picked-up image, and the special restart marker detecting step and the restart marker replacing step execute each process for all split images of the picked-up image.

6. The images combination processing method according to claim 5, further comprising:

a header attaching step of attaching a header which includes information indicating the data length counted by the data-length counting step, and information indicating an area of the picked-up image, where the split-image of the compressed data positions, to the compressed data into which the restart markers and the special restart marker are inserted by the restart marker inserting step; and a reading-order deciding step of deciding a reading order of the compressed data by the restart marker replacing step, with reference to headers attached to the compressed data of each split image that are stored in the compressed data storing means.

7. The images combination processing method according to claim 5, wherein the split-image compressing step executes a compression based on a JPEG system.

8. A computer program product for storing a program of machine-readable instructions for executing by a computer the images combination processing method according to claim 5.

9. An images combination processing system for executing combination processing of partial images that constitutes a picked-up image, comprising:

partial image compressing means for compressing image data of the partial images;

restart marker inserting means for inserting plural types of restart markers into compressed data, which are compressed by the partial image compressing means, from a head of the compressed data in a circulatory order of the plural types, and inserting a special restart marker into a rearmost portion of the compressed data;

data length counting means for counting a data length of the compressed data into which the restart markers and the special restart marker are inserted by the restart marker inserting means;

compressed data storing means for storing the compressed data of each partial image into which the restart markers are inserted;

special restart marker detecting means for detecting the special restart marker from areas in the compressed data storing means that are identified based on the data length counted by the data length counting means; and restart marker replacing means for reading compressed data that extend from the restart marker, which is inserted into the head of the compressed data, to the special restart marker from the compressed data storing means to replace the special restart marker with a last restart marker contained in the restart markers, wherein the partial image compressing means, the restart marker inserting means, and the data length counting means execute each process for each partial image constituting the picked-up image, and the special restart marker detecting means and the restart marker replacing means execute each process for all partial images constituting the picked-up image.

10. The images combination processing system according to claim 9, further comprising:

header attaching means for attaching a header which includes information indicating the data length counted by the data length counting means, and information indicating an area of the picked-up image, where the partial image of the compressed data positions, to the compressed data into which the restart markers and the special restart marker are inserted by the restart marker inserting means; and reading order deciding means for deciding an reading order of the compressed data by the restart marker replacing means, with reference to the header attached to the compressed data of each partial image that are stored in the compressed data storing means.

11. The images combination processing system according to claim 9, wherein the partial image compressing means executes a compression based on a JPEG system.

12. An imaging device comprising:

an imaging element including a plurality of imaging means which pick up partial images;

partial image compressing means for compressing image data of the partial images;

restart marker inserting means for inserting plural types of restart markers into compressed data, which are compressed by the partial image compressing means, from a head of the compressed data in a circulatory order of the plural types, and inserting a special restart marker into a rearmost portion of the compressed data;

data length counting means for counting a data length of the compressed data into which the restart markers and the special restart marker are inserted by the restart marker inserting means;

compressed data storing means for storing the compressed data of each partial image into which the restart markers are inserted;

special restart marker detecting means for detecting the special restart marker from areas in the compressed data storing means that are identified based on the data length counted by the data length counting means; and restart marker replacing means for reading compressed data that extend from the restart marker, which is inserted into the head of the compressed data, to the special restart marker from the compressed data storing means to replace the special restart marker with a last restart marker contained in the restart markers, wherein the partial image compressing means, the restart marker inserting means, and the data length counting means execute each process for each partial image constituting the picked-up image, and the special restart marker detecting means and the restart marker replacing means execute each process for all partial images constituting the picked-up image.

13. An images combination processing method of executing a combining processing of partial images that constitutes a picked-up image, comprising:

a partial image compressing step of compressing image data of the partial images;

a restart marker inserting step of inserting plural types of restart markers into compressed data, which are compressed by the partial image compressing step, from a head of the compressed data in a circulatory order of the plural types, and inserting a special restart marker into a rearmost portion of the compressed data;

a data length counting step of counting a data length of the compressed data into which the restart markers and the special restart marker are inserted by the restart marker inserting step;

a compressed data storing step of storing the compressed data of each partial image, into which the restart markers are inserted, in compressed data storing means;

a special restart marker detecting step of detecting the special restart marker from areas in the compressed data storing means that are identified based on the data length counted by the data length counting step; and a restart marker replacing step of reading compressed data that extend from the restart marker, which is inserted into the head of the compressed data, to the special restart marker from the compressed data storing step to replace the special restart marker with a last restart marker contained in the restart markers, wherein the partial image compressing step, the restart marker inserting step, and the data length counting step execute each process for each partial image constituting the picked-up image, and the special restart marker detecting step and the restart marker replacing step execute each process for all partial images constituting the picked-up image.

14. The images combination processing method according to claim 13, further comprising:

a header attaching step of attaching a header which includes information indicating the data length counted by the data length counting step, and information indicating an area of the picked-up image, where the partial image of the compressed data positions, to the compressed data into which the restart markers and the special restart marker are inserted by the restart marker inserting step; and a reading order deciding step of deciding an reading order of the compressed data by the restart marker replacing step, with reference to the header attached to the compressed data of each partial image that are stored in the compressed data storing step.

15. The images combination processing method according to claim 13, wherein the partial image compressing step executes a compression based on a JPEG system.

16. A computer readable medium storing a computer program for executing the images combination processing method according to claim 13.

17. An images combination processing system for executing combination processing of split images, comprising:

split-image compressing portion which compresses image data of each area out of a plurality of areas into which a picked-up image is split;

restart marker inserting portion which inserts plural types of restart markers into compressed data, which are compressed by the split-image compressing portion, from a head of the compressed data in a circulatory order of the plural types, and inserting a special restart marker into a rearmost portion of the compressed data;

data length counting portion which counts a data length of the compressed data into which the restart markers and the special restart marker are inserted by the restart marker inserting portion;

compressed data storing portion which stores the compressed data of each split image into which the restart markers are inserted;

special restart marker detecting portion which detects the special restart marker from areas in the compressed data storing portion, which are identified based on the data length counted by the data length counting portion; and restart marker replacing portion which reads compressed data that extend from the restart marker, which is inserted into the head of the compressed data, to the special restart marker from the compressed data storing portion to replace the special restart marker with a last restart marker contained in the restart markers, wherein the split-image compressing portion, the restart marker inserting portion, and the data length counting portion execute each process for each split image of the picked-up image, and the special restart marker detecting portion and the restart marker replacing portion execute each process for all split images of the picked-up image.

18. The images combination processing system according to claim 17, further comprising:

header attaching portion which attaches a header which includes information indicating the data length counted by the data length counting portion, and information indicating an area of the picked-up image, where the split-image of the compressed data positions, to the compressed data into which the restart markers and the special restart marker are inserted by the restart marker inserting portion; and reading-order deciding portion which decides a reading order of the compressed data by the restart marker replacing portion, with reference to headers attached to the compressed data of each split image that are stored in the compressed data storing portion.

19. The images combination processing system according to claim 17, wherein the split-image compressing portion executes a compression based on a JPEG system.

20. An images combination processing system for executing combination processing of partial images that constitutes a picked-up image, comprising:

partial image compressing portion which compresses image data of the partial images;

restart marker inserting portion which inserts plural types of restart markers into compressed data, which are compressed by the partial image compressing portion, from a head of the compressed data in a circulatory order of the plural types, and inserting a special restart marker into a rearmost portion of the compressed data;

data length counting portion which counts a data length of the compressed data into which the restart markers and the special restart marker are inserted by the restart marker inserting portion;

compressed data storing portion which stores the compressed data of each partial image into which the restart markers are inserted;

special restart marker detecting portion for detecting the special restart marker from areas in the compressed data storing portion that are identified based on the data length counted by the data length counting portion; and restart marker replacing portion which reads compressed data that extend from the restart marker, which is inserted into the head of the compressed data, to the special restart marker from the compressed data storing portion to replace the special restart marker with a last restart marker contained in the restart markers, wherein the partial image compressing portion, the restart marker inserting portion, and the data length counting portion execute each process for each partial image constituting the picked-up image, and the special restart marker detecting portion and the restart marker replacing portion execute each process for all partial images constituting the picked-up image.

21. The images combination processing system according to claim 20, further comprising:

header attaching portion which attaches a header which includes information indicating the data length counted by the data length counting portion, and information indicating an area of the picked-up image, where the partial image of the compressed data positions, to the compressed data into which the restart markers and the special restart marker are inserted by the restart marker inserting portion; and reading order deciding portion which decides an reading order of the compressed data by the restart marker replacing portion, with reference to the header attached to the compressed data of each partial image that are stored in the compressed data storing portion.

22. The images combination processing system according to claim 20, wherein the partial image compressing portion executes a compression based on a JPEG system.

* * * * *